US011996256B2

(12) United States Patent
Manev et al.

(10) Patent No.: US 11,996,256 B2
(45) Date of Patent: May 28, 2024

(54) SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

(71) Applicant: HITACHI ENERGY LTD, Zürich (CH)

(72) Inventors: Georgi Manev, Sofia (BG); Todor Kokev, Sofia (BG); Angel Mihaylov, Plovdiv (BG)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/020,471

(22) PCT Filed: Jul. 5, 2021

(86) PCT No.: PCT/EP2021/068484
§ 371 (c)(1),
(2) Date: Feb. 9, 2023

(87) PCT Pub. No.: WO2022/083904
PCT Pub. Date: Apr. 28, 2022

(65) Prior Publication Data
US 2023/0230782 A1 Jul. 20, 2023

(30) Foreign Application Priority Data
Oct. 21, 2020 (EP) ..................................... 20202952

(51) Int. Cl.
*H01H 9/00* (2006.01)

(52) U.S. Cl.
CPC ................................ *H01H 9/0027* (2013.01)

(58) Field of Classification Search
CPC .......... H01H 9/0027; H01H 3/44; H01H 9/00; H01H 3/40; H01H 19/00; H01H 21/00; H01H 3/30; H01H 13/72; H01H 9/0005
(Continued)

(56) References Cited

U.S. PATENT DOCUMENTS 3,445,611 A * 5/1969 Bleibtreu ............ H01H 9/0027
200/11 TC
5,056,377 A * 10/1991 Yatchum .............. H01H 9/0027
74/436

FOREIGN PATENT DOCUMENTS

CN 101990693 A 3/2011
CN 103534776 A 1/2014
(Continued)

OTHER PUBLICATIONS

International Search Report and Written Opinion of the International Searching Authority, PCT/EP2021/068484, dated Sep. 30, 2021, 13 pages.
(Continued)

*Primary Examiner* — Renee S Luebke
*Assistant Examiner* — Iman Malakooti
(74) *Attorney, Agent, or Firm* — Sage Patent Group

(57) ABSTRACT

A switching system for an on-load tap changer comprises: a Geneva mechanism, wherein the Geneva mechanism comprises: a holder, the holder being fixed relative to a housing;
a rotatable ring with a recess, the rotatable ring being supported by the holder and being rotatable relative to the holder;
a connector, the connector being rotatable together with the rotatable ring to electrically connect with a tap of the tap changer; and a rotatable driving wheel with a protrusion, the protrusion being coupleable with the
(Continued)

recess to rotate the rotatable ring, the driving wheel being arranged inside the rotatable ring.

18 Claims, 3 Drawing Sheets

(58) Field of Classification Search
USPC .................. 200/11 TC, 17 R, 238; 323/340; 336/137
See application file for complete search history.

(56) References Cited

FOREIGN PATENT DOCUMENTS

| | | | | | |
|---|---|---|---|---|---|
| DE | 3838195 | A1 | | 5/1989 | |
| FR | 2066439 | | * | 6/1971 | ........... H01H 9/0027 |
| GB | 1585352 | | * | 4/1981 | ............. H01F 29/04 |
| KR | 20180120165 | A | | 11/2018 | |
| KR | 20230048567 | A | | 4/2023 | |
| KR | 20230128396 | A | | 9/2023 | |
| WO | 2018148811 | A1 | | 3/2018 | |

OTHER PUBLICATIONS

First Office Action for Chinese Patent Application No. 2021800664833, dated Aug. 26, 2023, 5 pages.
Decision for Grant for Korean Patent Application No. 10-2023-7010632, mailed Dec. 22, 2023, 6 pages.

* cited by examiner

SWITCHING SYSTEM FOR AN ON-LOAD TAP CHANGER, ON-LOAD TAP CHANGER AND METHOD FOR SWITCHING A TAP CONNECTION OF AN ON-LOAD TAP CHANGER

CROSS REFERENCE TO RELATED APPLICATIONS

This application is a 35 U.S.C. § 371 national stage application of PCT International Application No. PCT/EP2021/068484 filed on Jul. 5, 2021, which in turn claims priority to European Patent Application No. 20202952.6, filed on Oct. 21, 2020, the disclosures and content of which are incorporated by reference herein in their entireties.

TECHNICAL FIELD

The present disclosure relates to a switching system for an on-load tap changer, e.g., a switching system for switching a tap connection of the on-load tap changer. The present disclosure further relates to an on-load tap changer comprising such a switching system and a method for switching a tap connection in particular by using a switching system disclosed herein.

On-load tap changers, for example, are built into power transformers and regulate their voltage under-load, i.e., without interrupting the power supply to consumers.

DE 3 838 195 A1 relates to a power tap changer with a first Maltese-cross mechanism for opening the moving contacts from stationary contacts and a second Maltese-cross mechanism for moving the moving contacts.

WO 2018/148811 A1 relates to a selector for an on-load-tap changer, which comprises a drive shaft with a double transfer element, each of which comprising a Geneva Cross wheels.

It is desirable to provide a switching system for an on-load tap changer that is reliable and allows an easy switching as well as a corresponding on-load tap changer and a corresponding method for switching a tap connection of an on-load tap changer.

SUMMARY

According to an embodiment a switching system for an on-load tap changer comprises:

- a Geneva mechanism, wherein the Geneva mechanism comprises:
  - a holder, the holder being fixed relative to a housing;
  - a rotatable ring with a recess, the rotatable ring being supported by the holder and being rotatable relative to the holder;
  - a connector, the connector being rotatable together with the rotatable ring to electrically connect with a tap of the tap changer; and
  - a rotatable driving wheel with a protrusion, the protrusion being coupleable with the recess to rotate the rotatable ring, the driving wheel being arranged inside the rotatable ring.

The switching system allows an application of a Geneva mechanism in an on-load tap changer. During operation, the rotatable driving wheel rotates about its longitudinal axis and thereby rotates the protrusion. When the protrusion is connected to the recess, the driving force of the driving wheel is transmitted to the rotatable ring. Thus, the connector is rotated and a connection with a specific tap of the tap changer is possible.

Only the rotatable ring needs to be moved to change the position of the connector. The rotatable ring rotates around a phase unit and other static elements of the on-load tap changer. For example, the rotatable ring rotates relative to the holder and the diverter switch of the phase of the on-load tap changer. This allow a reduction of the complexity of the driving mechanism and makes an increase in reliability possible. Furthermore, a large number of individual positions for the connector is possible and thus more tap positions are possible. Since only the rotatable ring needs to be moved, the masses that need to be moved for a tap change are reduced. Thereby flywheel energy is reduced and the requirements for damping are reduced.

According to a further embodiment the switching system comprises a drive shaft. The drive shaft is rotatable to rotate the driving wheel. The drive shaft is arranged eccentrically to the rotatable ring. The eccentric orientation of the drive shaft allows an efficient use of space inside the housing.

According to a further embodiment the switching system comprises a bearing arrangement. The bearing arrangement is configured to guide the rotation of the rotatable ring around the holder. Thus, the friction between the rotatable ring and the holder can be reduced and thereby the force needed to move the rotatable ring can be reduced.

According to a further embodiment the bearing arrangement comprises a plurality of bearings. The bearings are coupled to the holder. For example, the bearings comprise ball bearings that are arranged to support the rotatable ring with respect to the holder and to reduce a friction between the rotatable ring and the holder. Thus, the rotatable ring is fastened, attached and supported on the holder in a way that a reliable rotational movement and positioning relative to the housing is possible.

According to a further embodiment, the rotatable ring comprises a current carrier ring. The current carrier ring is electrically connected with the connector. For example, the current carrier ring is a copper ring or comprises copper or another electrically conductive material. The rotatable ring further comprises a drive ring. A drive ring is fixed relative to the current carrier ring and is rotatable by the driving wheel. For example, the drive ring is made out of an electrically insulating material. The drive ring is configured to transmit a rotational force of the driving wheel vent to electrically insulate the drive ring from the current carrier ring.

According to a further embodiment, the drive ring comprises an intermediate ring and a Geneva ring. The Geneva ring comprises the recess. For example, the Geneva ring comprises a multitude of recesses, for example three recesses, four recesses, five recesses, six recesses or more recesses. The intermediate ring is arranged between the Geneva ring and the current carrier ring to transmit a rotational force from the Geneva ring to the current carrier ring. Thus, the Geneva ring can be designed to beneficially interact with the driving wheel and the protrusion. The driving wheel and the Geneva wheel form an internal Geneva mechanism. The intermediate ring allows reliable support of the rotatable ring on the holder. Furthermore, the intermediate ring realizes the electrical insulation.

According to a further embodiment, the switching system comprises a further Geneva mechanism. For example, the further Geneva mechanism is configured and designed like the first Geneva mechanism described herein. The Geneva mechanism and the further Geneva mechanism correspond to each other in a way that they allow a rotation of the respective rotatable ring by a Geneva mechanism. For example, the Geneva mechanism is arranged to connect the respective connector to a tap at odd positions. The further Geneva mechanism, for example, is arranged to connect the respective connector to taps at even positions. For example, the respective rotatable rings of the Geneva mechanism and the further Geneva mechanism are turned alternately. The Geneva mechanism and the further Geneva mechanism, for example, are arranged axially offset from each other. For example, the drive shaft is arranged to rotate the driving wheels of both Geneva mechanisms and the Geneva mechanism, and the further Geneva mechanism are arranged axially offset from each other along the longitudinal axis of the drive shaft.

According to an embodiment, an on-load tap changer comprises a switching system according to at least one embodiment described herein. The on-load tap changer comprises the housing and the switching system is arranged inside the housing. The housing surrounds the rotatable ring coaxially. The on-load tap changer comprises the tap. The tap is fixed to the housing. For example, the on-load tap changer comprises a multitude of taps, in particular four, five, six, seven, eight, nine, ten, eleven, twelve, thirteen, fourteen or more taps.

According to a further embodiment the on-load tap changer comprises a number of taps. The rotatable ring comprises a number of recesses. The number of recesses corresponds to the number of taps. In case there are two Geneva mechanisms with two rotatable rings the number of recesses is equal to half the number of taps. The number of taps is divided equally between the rotatable ring of the Geneva mechanism and the further rotatable ring of the further Geneva mechanism. For example, the taps of the on-load tap changer are arranged into ring-shaped arrangements which are axially offset from each other. Each rotatable ring comprises the number of recesses such that it is able to contact the taps that are assigned to it.

According to an embodiment a method for switching a tap connection of an on-load tap changer comprises:

- rotating a driving wheel, which comprises a protrusion;
- coupling the protrusion to a recess of a rotatable ring;
- rotating the rotatable ring; and
- rotating a connector relative to a tap of the on-load tap changer.

Thereby only reduced masses have to be moved and thus the reliability of the positioning of the rotatable ring can be enhanced.

According to a further embodiment, the method comprises:

- rotating a further driving wheel, which comprises a further protrusion;
- coupling the further protrusion to a further recess of a further rotatable ring;
- rotating the further rotatable ring; and
- rotating a further connector relative to a further tap of the on-load tap changer, wherein the protrusion and the further protrusion are arranged relative to each other in such a way that they alternately rotate the respective corresponding rotatable ring.

Thus, switching operations between all odd and even positions are possible.

For example, the method for switching the tap connection is performed with the aid of a switching system described herein. Features and advantages described in connection with the switching system also apply to the method and the other way around.

BRIEF DESCRIPTION OF THE DRAWINGS

The present disclosure will be further described with reference to the accompanying drawings, wherein.

Throughout the drawings, identical components and components of the same type and effect may be represented by the same reference signs.

DETAILED DESCRIPTION

Figure 1:
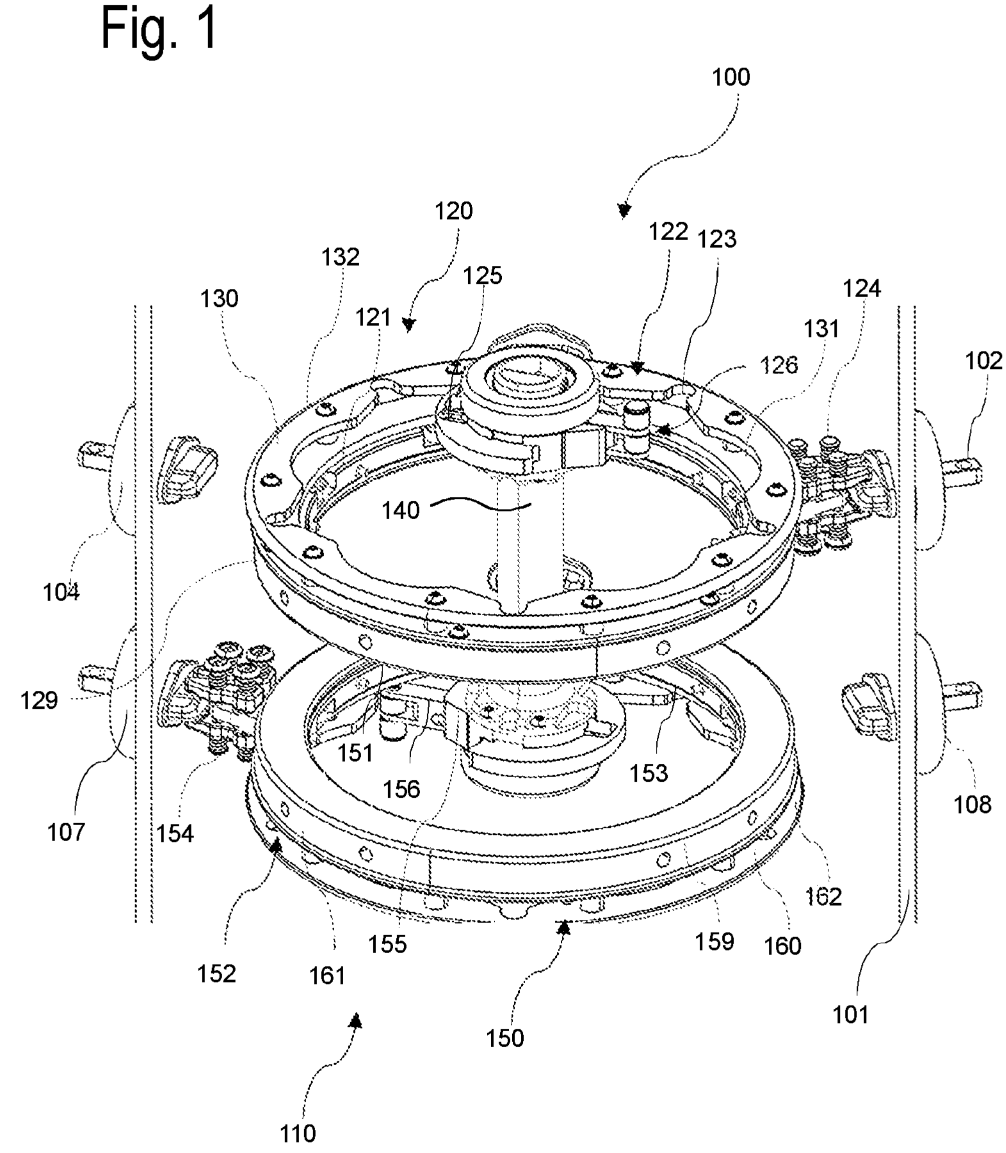
FIG. 1 is a schematic view of an on-load tap changer according to an embodiment.

FIG. 1 shows an exemplary embodiment of an on-load tap changer 100 at least in parts.

Figure 2:
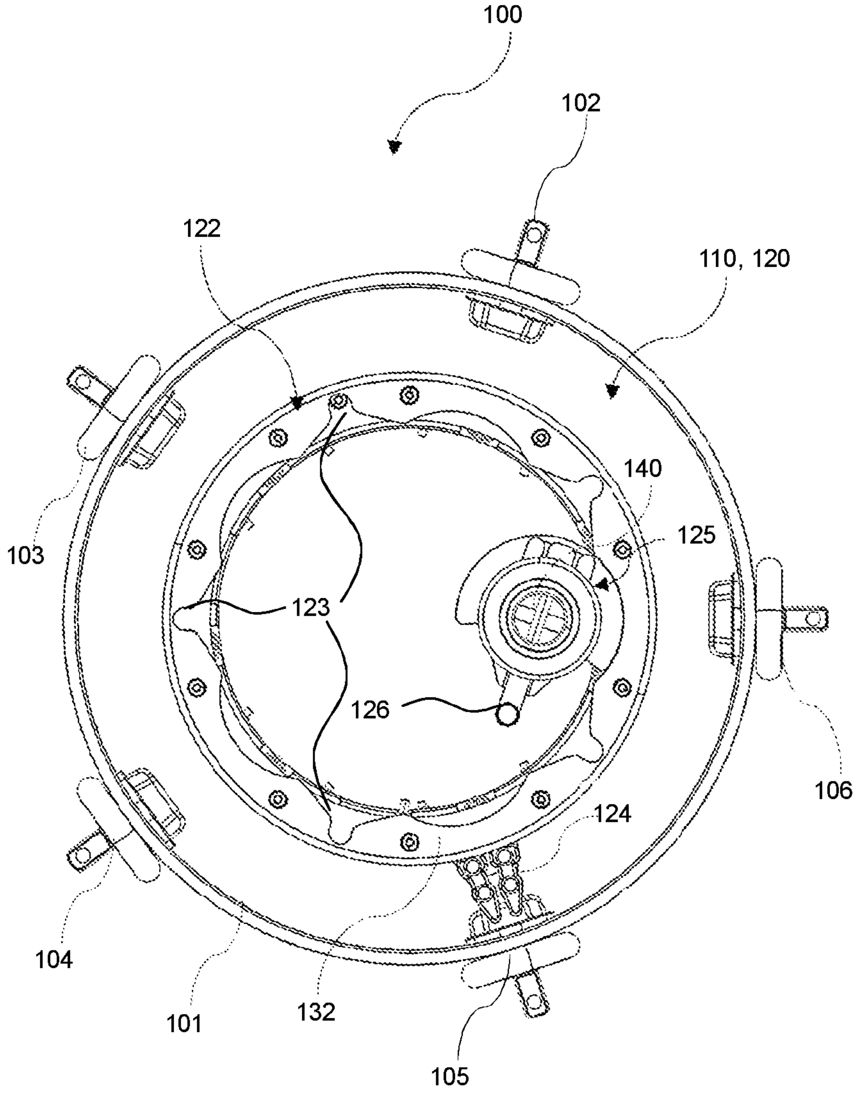
FIG. 2 is a schematic view of the on-load tap changer according to an embodiment.

The on-load tap changer is configured for regulation of the output voltage of a power transformer to required levels. With the aid of the on-load tap changer the turn ratios of the transformer can be altered. A cylindrical housing 101 surrounds a switching system 110. Taps 102 to 108 (see also FIG. 2) are arranged in circular forms at the housing. For example, the taps 102 to 108 are arranged in two circles that are offset from each other with respect to a longitudinal axis of the housing 101.

A drive shaft 140 is arranged inside the housing 101. The drive shaft 140 can be driven by a motor or another actuator to rotate around its longitudinal axis. The drive shaft 140 drives a first Geneva mechanism 120 and a further Geneva mechanism 150. The further Geneva mechanism 150 may also be referred to as the second Geneva mechanism 150. The first Geneva mechanism 120 and the further Geneva mechanism 150 are constructed in the same way. Therefore, features and advantages described in connection with one of the Geneva mechanisms 120, 150 apply to the other one of the Geneva mechanisms 120, 150.

The Geneva mechanism 120 comprises a holder 121. The holder 121 is immovable with respect to housing 101. The holder is a ring-shaped element that is configured and designed to hold further elements of the Geneva mechanism 120 that may rotate to the housing 101 and the holder 121.

The Geneva mechanism 120 comprises a rotatable ring 122. The rotatable ring 122 is coupled to the holder 121. The rotatable ring 122 is supported by the holder 121 such that the rotatable ring 122 is rotatable with respect to the holder 121. Thereby, the rotatable ring 122 is rotatable relative to the housing 101 and the taps 102 to 106 as well. The housing 101, the holder 121 and the rotatable ring 122 are arranged coaxially. The drive shaft 140 is arranged eccentrically inside the housing 101 offset to the longitudinal axis around which the rotatable ring 122 rotates.

The rotatable ring 122 comprises a current carrier ring 129. The current carrier ring 129 is made out of an electrically conductive material and is configured to conduct electrical current.

The rotatable ring 122 comprises a drive ring 130. The drive ring 130 comprises a plurality of recesses 123. For example, the drive ring 130 comprises as many recesses 123 as taps 102 to 106 are arranged in the corresponding line at the housing 101. For example, the drive ring 130 comprises five recesses 123 and five taps 102 to 106 are arranged at the circumference of the drive ring 130 at the housing 101 (see also FIG. 2). For example, the recesses 123 are formed in a Geneva ring 132 that is part of the drive ring 130. The Geneva ring 132 comprises the recesses and is connected to an intermediate ring 131 of the drive ring 130. This allows a decoupling of the Geneva ring 132 from the current carrier ring 129 and an easy mounting.

The recesses 123 are open to an inner side of the rotatable ring 122. The recesses 123 penetrate into the rotatable ring 122 from a central inner side. Thus, an internal Geneva mechanism 120 is realized.

The intermediate ring 131 is mechanically connected to the current carrier ring 129. The Geneva ring 132 is mechanically connected to the intermediate ring 131. The intermediate ring 131 is arranged between the current carrier ring 129 and the Geneva ring 132.

A connector 124 is electrically and mechanically connected with the current carrier ring 129. The connector 124 is configured and designed to couple with one of the respective taps 102 to 106 to conduct electrical current between the current carrier ring 129 and the respective tap 102 to 106. By rotating the current carrier ring 129 together with the connector 124, the connector 124 can be connected to a desired one of the respective taps 102 to 106.

The rotation of the current carrier ring 129 is caused by a rotation of the drive shaft 140. The rotation of the drive shaft 140 is transmitted to the rotatable ring 122 via a driving wheel 125. The driving wheel 125 is connected to the drive shaft 140 and rotates together with the drive shaft 140. The driving wheel 125 comprises a protrusion 126. The protrusion protrudes radially with respect to the drive shaft 140. The protrusion 126 is configured to interact and engage with the recess 123. When the protrusion engages the recess 123, the rotatable ring 122 rotates together with the driving wheel 125. Thereby the connector 124 is moved from one tap, for example tap 102, to the directly adjacent next tap, for example tap 103. After the protrusion 126 leaves the recess 123, the rotatable ring 122 stands still and the driving wheel 125 rotates relatively to the rotatable ring 122. The rotation of the driving wheel 125 is not transmitted to the rotatable ring 122. Thus, the driving wheel 125 rotates uniformly and the rotatable ring 122 rotates step-by-step between specific positions. These specific positions correspond to the positions of the taps 102 to 106.

The second Geneva mechanism 150 is configured in a same way.

The second Geneva mechanism 150 comprises a second holder 151. The holder second 151 is immovable with respect to housing 101. The second holder is a ring-shaped element that is configured and designed to hold further elements of the second Geneva mechanism 150 that may rotate to the housing 101 and the second holder 151.

The second Geneva mechanism 150 comprises a second rotatable ring 152. The second rotatable ring 152 is coupled to the second holder 151. The second rotatable ring 152 is supported by the second holder second 151 such that the second rotatable ring 152 is rotatable with respect to the second holder 151. Thereby, the second rotatable ring 152 is rotatable relative to the housing 101 and the taps 102 to 107 as well. The housing 101, the second holder 151 and second the rotatable ring 152 are arranged coaxially. The drive shaft 140 is arranged eccentrically inside the housing 101 offset to the longitudinal axis around which the second rotatable ring 152 rotates.

The second rotatable ring 152 comprises a second current carrier ring 159. The second current carrier ring 159 is made out of an electrically conductive material and is configured to conduct electrical current.

The second rotatable ring 152 comprises a second drive ring 160. The second drive ring 160 comprises a plurality of recesses 153. For example, the second drive ring 160 comprises as many recesses 153 as taps 107, 108 are arranged in the corresponding line at the housing 101. For example, the second drive ring 160 comprises five recesses 153 and five taps 107, 108 are arranged at the circumference of the second drive ring 160 at the housing 101. For example, the recesses 153 are formed in a second Geneva ring 162 that is part of the second drive ring 160. The second Geneva ring 162 comprises the recesses 153 and is connected to a second intermediate ring 161 of the second drive ring 160. This allows a decoupling of the second Geneva ring 162 from the second current carrier ring 159 and an easy mounting.

The recesses 153 are open to an inner side of the second rotatable ring 152. The recesses 153 penetrate into the second rotatable ring 152 from a central inner side. Thus, an internal Geneva mechanism 150 is realized.

The second intermediate ring 161 is mechanically connected to the second current carrier ring 159. The second Geneva ring 162 is mechanically connected to the second intermediate ring 161. The second intermediate ring 161 is arranged between the second current carrier ring 159 and the second Geneva ring 162.

A second connector 154 is electrically and mechanically connected with the second current carrier ring 159. The second connector 154 is configured and designed to couple with one of the respective taps 107, 108 to conduct electrical current between the second current carrier ring 159 and the respective tap 107, 108. By rotating the current second carrier ring 159 together with the second connector 154, the second connector 154 can be connected to a desired one of the respective taps 107, 108.

The rotation of the second current carrier ring 159 is caused by a rotation of the drive shaft 140. The rotation of the drive shaft 140 is transmitted to the second rotatable ring 152 via a second driving wheel 155. The second driving wheel 155 is connected to the drive shaft 140 and rotates together with the drive shaft 140. The second driving wheel 155 comprises a second protrusion 156. The second protrusion 156 protrudes radially with respect to the drive shaft 140. The second protrusion 156 is configured to interact and engage with the recesses 153. When the second protrusion 156 engages the recess 153, the second rotatable ring 152 rotates together with the second driving wheel 155. Thereby the second connector 154 is moved from one tap, for example tap 107, to the directly adjacent next tap in the corresponding level. After the second protrusion 156 leaves the recess 153, the second rotatable ring 152 stands still and the second driving wheel 155 rotates relatively to the second rotatable ring 152. The rotation of the second driving wheel 155 is not transmitted to the second rotatable ring 152. Thus, the second driving wheel 155 rotates uniformly and the second rotatable ring 152 rotates step-by-step between specific positions. These specific positions correspond to the positions of the corresponding taps 107, 108.

The further protrusion 156 of the second Geneva Mechanism 150 is offset to the protrusion 126 of the first Geneva mechanism 120. Thus, the rotatable ring 122 of the first Geneva mechanism 120 and the further rotatable ring 152 of the further Geneva mechanism 150 can be moved successively one after another. When the protrusion 126 engages the recess 123 and moves the rotatable ring 122, the further protrusion 156 runs at idle and does not move the further rotatable ring 152. After disconnection of the protrusion 126 out of the recess 123, the further protrusion 156 engages the further recess 153 and the further rotatable ring 152 moves. Thus, it is possible to drive the Geneva mechanism 120 and the further Geneva mechanism 150 with the same drive shaft 140. The driving wheel 125 and the further driving wheel

155 are connected to the drive shaft 140 and move uniformly. For example, with the Geneva mechanism 120 the even numbers of the connections of the tap changer 100 are connectable and with the further Geneva mechanism 150 the odd numbers of the connections of the tap changer 100 are connectable.

More than two Geneva mechanisms with rotatable rings driven by driving wheels of the drive shaft 140 are possible, for example three, four or more Geneva mechanisms, like Geneva mechanism 120.

Figure 3:
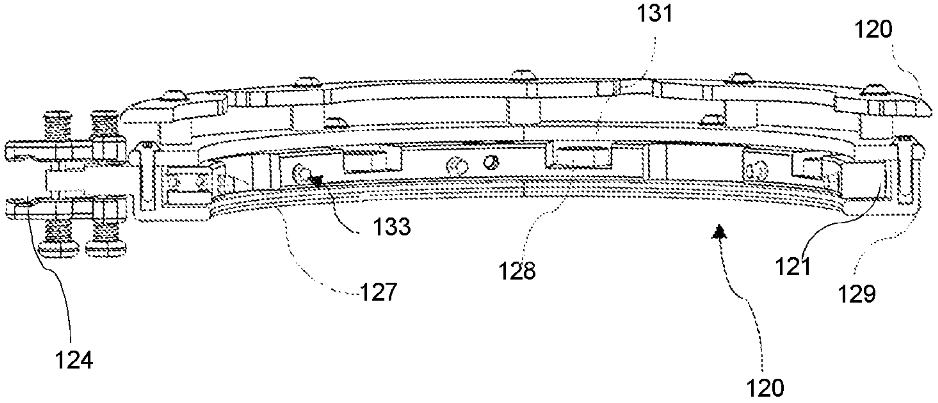
FIG. 3 is a schematic view of a part of a switching system according to an embodiment.

FIG. 3 shows a bearing arrangement 127 that is arranged between the holder 121 and the rotatable ring 122. For example, the intermediate ring 131 and the current carrier ring 129 are coupled together to the holder 121 to support the rotatable ring 122. The bearing arrangement 127 is configured to reduce the friction between the holder 121 and the intermediate ring 131 and the current carrier ring 129 when the current carrier ring 129 together with the intermediate ring 131 rotates to the holder 121. For example, the bearing arrangement 127 comprises a multitude of bearings 128, for example four bearings or other amounts of bearings. The holder 121 and the rotatable ring 122 are coupled with each other by mountings 133. For example, the mountings 133 are realized as bolts that provide a radial support for the rotatable ring 122 at the holder 121. Alternatively, or in addition, rolls or other mountings are provided to axially support the rotatable ring 122 at the holder 121. The connection between the further holder 151 and the further rotatable ring 152 is realized correspondingly.

Figure 4:
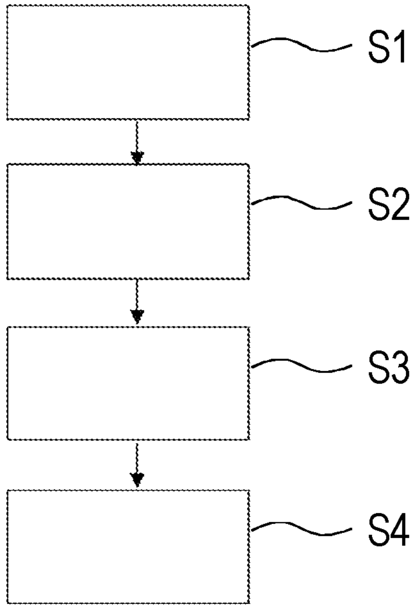
FIG. 4 is a flowchart of a method for switching a tap connection according to an embodiment.

FIG. 4 shows a flowchart of a method for switching a tap connection of the on-load tap changer 100 according to an embodiment.

In step S1 the driving wheels 125, 155 are rotated.

One of the protrusions 126, 156, for example the further protrusion 156, couples to the corresponding recess 123, 153, for example to the further recess 153 (step S2). In this example, the protrusion 126 is not connected to the recess 123 and runs at idle.

The connection of the further protrusion 156 with the further recess 153 leads to a rotation of the further rotatable ring 152 (step S3). The rotatable ring 122 is not rotated and keeps its position.

In step S4 the further connector 154 rotates driven by the rotation of the further rotated ring 152 relative to the housing 101. Thereby the further connector 154 decouples from one of the taps and connects with the next one of the corresponding taps, for example tap 108.

When the driving wheels 125, 155 rotate further, the further protrusion 156 rotates idle. The protrusion 126 of the driving wheel 125 engages the recess 123 of the rotatable ring 122 and thereby moves the connector 124 to another tap.

The on-load tap changer 100 with the Geneva mechanisms 120, 150 reduces the complexity of the interconnected mechanisms and benefits the reliability of the overall system. The rotatable rings 122, 152 rotate independently by means of the respective driving wheels 125, 155 around the phase unit, for example the statically placed diverter switch of the phase of the on-load tap changer 100. The tap changer 100 with the Geneva mechanisms 120, 150 makes a large number of individual positions of the connectors 124, 154 possible, for example six or more positions for each connector 124, 154. This also makes a more significant number of tap positions possible.

The holders 121, 151 and the rotatable rings 122, 152 are placed concentrically inside the insulation cylinder of the on-load tap changer 100. The switching operations between all odd and even positions of the tap changer 100, respectively the movement of the selector, are performed via the driving wheels 125, 155. The rotatable ring 122 of the first Geneva mechanism 120 and the protrusion 126 of the driving wheel 125 are angularly displaced in relation to the further rotatable ring 152 and the further protrusion 156 of the further driving wheel 155. Thus, by performing a switching operation both rotatable rings 122, 152 move in a subsequent motion and thereby select the relevant tap position.

The rotatable motion by the internal Geneva mechanisms 120, 150 is implemented via the connection of the respective Geneva rings 132, 162 to the respective intermediate rings 131, 161 and the respective current carrier rings 129, 159 which are embedded around the static fixed holders 121, 151 via mountings 133 and the bearing arrangements 127.

As only the rotatable rings 122, 152 need to be moved, the rotated masses are comparatively low and thereby there is no need for excessive dampening because the flywheel energy is low. This leads to a reliable system that allows a large number of tap positions.

REFERENCE SIGNS

100 on-load tap changer
101 housing
102, 103, 104, 105, 106, 107, 108 tap
110 switching system
120 Geneva mechanism
121 holder
122 rotatable ring
123 recess
124 connector
125 driving wheel
126 protrusion
127 bearing arrangement
128 bearing
129 current carrier ring
130 drive ring
131 intermediate ring
132 Geneva ring
133 mounting
140 drive shaft
150 further Geneva mechanism
151 further holder
152 further rotatable ring
153 further recess
154 further connector
155 further driving wheel
156 further protrusion
159 further current carrier ring
160 further drive ring
161 further intermediate ring
162 further Geneva ring
S1 to S4 method steps

The invention claimed is:

1. A switching system for an on-load tap changer, comprising:

a Geneva mechanism, wherein the Geneva mechanism comprises:

a rotatable ring with a recess, the rotatable ring comprising a current carrier ring and a drive ring being fixed relative to the current carrier ring;

a connector being rotatable together with the rotatable ring to electrically connect with a tap of the on-load tap changer, the current carrier ring being electrically connected to the connector;

a rotatable driving wheel with a protrusion, the protrusion being coupleable with the recess to rotate the rotatable ring, the drive ring being rotatable by the driving wheel; and a holder being fixed relative to a housing, wherein the rotatable ring is supported by the holder and being rotatable relative to the holder, and the driving wheel is arranged inside the rotatable ring.

2. The switching system according to claim 1, comprising:

a drive shaft, the drive shaft being rotatable to rotate the driving wheel, wherein the drive shaft is arranged eccentrically to the rotatable ring.

3. The switching system according to claim 1, comprising:

a bearing arrangement to guide the rotation of the rotatable ring around the holder.

4. The switching system according to claim 3, wherein the bearing arrangement comprises a plurality of bearings, the bearings being coupled to the holder.

5. The switching system according to claim 1, wherein the drive ring comprises:

an intermediate ring; and a Geneva ring, the Geneva ring comprising the recess, wherein the intermediate ring is arranged between the Geneva ring and the current carrier ring to transmit a rotational force from the Geneva ring to the current carrier ring.

6. A switching system for an on-load tap changer, comprising:

a Geneva mechanism, wherein the Geneva mechanism comprises:

a rotatable ring with a recess, the rotatable ring comprising a current carrier ring and a drive ring being fixed relative to the current carrier ring;

a connector being rotatable together with the rotatable ring to electrically connect with a tap of the on-load tap changer, the current carrier ring being electrically connected to the connector;

a rotatable driving wheel with a protrusion, the protrusion being coupleable with the recess to rotate the rotatable ring, the drive ring being rotatable by the driving wheel;

a holder, the holder being fixed relative to a housing, wherein the rotatable ring is supported by the holder and being rotatable relative to the holder, and the driving wheel is arranged inside the rotatable ring; and a further Geneva mechanism which corresponds to the Geneva mechanism, wherein the Geneva mechanism and the further Geneva mechanism are arranged axially offset from each other.

7. The switching system according to claim 6, further comprising:

a drive shaft, the drive shaft being rotatable to rotate the driving wheel, wherein the drive shaft is arranged eccentrically to the rotatable ring.

8. The switching system according to claim 6, further comprising:

a bearing arrangement to guide the rotation of the rotatable ring around the holder.

9. The switching system according to claim 8, wherein the bearing arrangement comprises a plurality of bearings, the bearings being coupled to the holder.

10. The switching system according to claim 6, wherein the drive ring comprises:

an intermediate ring; and a Geneva ring, the Geneva ring comprising the recess, wherein the intermediate ring is arranged between the Geneva ring and the current carrier ring to transmit a rotational force from the Geneva ring to the current carrier ring.

11. An on-load tap changer, comprising:

a switching system comprising a Geneva mechanism, wherein the Geneva mechanism comprises:

a rotatable ring with a recess, the rotatable ring comprising a current carrier ring and a drive ring being fixed relative to the current carrier ring;

a connector being rotatable together with the rotatable ring to electrically connect with a tap of the on-load tap changer, the current carrier ring being electrically connected to the connector;

a rotatable driving wheel with a protrusion, the protrusion being coupleable with the recess to rotate the rotatable ring, the drive ring being rotatable by the driving wheel; and a holder being fixed relative to a housing, wherein the rotatable ring is supported by the holder and being rotatable relative to the holder, and the driving wheel is arranged inside the rotatable ring;

the housing, the switching system being arranged inside the housing and the housing surrounding the rotatable ring coaxially, the tap being fixed to the housing.

12. The on-load tap changer according to claim 11, comprising a number of taps, the taps being evenly spaced at the housing around the switching system, wherein the rotatable ring comprises a number of recesses, the number of recesses corresponding to the number of taps.

13. A method for switching a tap connection of an on-load tap changer according to claim 11, comprising:

rotating a driving wheel, which comprises a protrusion;

coupling the protrusion to a recess of a rotatable ring;

rotating the rotatable ring; and rotating a connector relative to a tap of the on-load tap changer.

14. The method according to claim 13, comprising:

rotating a further driving wheel, which comprises a further protrusion;

coupling the further protrusion to a further recess of a further rotatable ring;

rotating the further rotatable ring; and rotating a further connector relative to a further tap of the on-load tap changer, wherein the protrusion and the further protrusion are arranged relative to each other in such a way that they alternately rotate the respective corresponding rotatable ring.

15. The on-load tap changer according to claim 11, the switching system further comprising:

a drive shaft, the drive shaft being rotatable to rotate the driving wheel, wherein the drive shaft is arranged eccentrically to the rotatable ring.

16. The on-load tap changer according to claim 11, the switching system further comprising:

a bearing arrangement to guide the rotation of the rotatable ring around the holder.

17. The on-load tap changer according to claim 16, wherein the bearing arrangement comprises a plurality of bearings, the bearings being coupled to the holder.

18. The on-load tap changer according to claim 11, wherein the drive ring comprises:

an intermediate ring; and a Geneva ring, the Geneva ring comprising the recess, wherein the intermediate ring is arranged between the Geneva ring and the current carrier ring to transmit a rotational force from the Geneva ring to the current carrier ring.

* * * * *